United States Patent
Wu et al.

(10) Patent No.: US 12,388,291 B2
(45) Date of Patent: Aug. 12, 2025

(54) THERMAL-POWER DIRECT-HUNG ENERGY-STORAGE FREQUENCY MODULATION PLANT BACKUP POWER SYSTEM

(71) Applicants: Xi'an Thermal Power Research Institute Co., Ltd, Xi'an (CN); Huaneng Luoyuan Power Generation Co., Ltd, Fuzhou (CN)

(72) Inventors: Pengyue Wu, Xi'an (CN); Zhiliang Lin, Fuzhou (CN); Peihao Yang, Xi'an (CN); Xiaofeng Xue, Fuzhou (CN); Xiliang Pan, Fuzhou (CN); Shuichao Kou, Xi'an (CN); Hao Guo, Xi'an (CN); Bin Jiang, Fuzhou (CN); Xiaobin Liang, Fuzhou (CN); Xiaohui Wang, Xi'an (CN); Yunfei Yan, Xi'an (CN); Yue Yin, Xi'an (CN); Zhipeng Li, Xi'an (CN); Lisong Zhang, Xi'an (CN); Jiewen Wang, Xi'an (CN); Benqian Dai, Xi'an (CN); Jinghua Li, Xi'an (CN); Shuting Qiu, Fuzhou (CN); Zongzhen Zhang, Fuzhou (CN); Bingjiao Wang, Fuzhou (CN); Han Wei, Fuzhou (CN); Feng Gao, Xi'an (CN); Mengyao Sun, Xi'an (CN); Junbo Zhao, Xi'an (CN); Xinyu Guo, Xi'an (CN); Ting He, Xi'an (CN); Lei Xue, Xi'an (CN)

(73) Assignees: Xi'an Thermal Power Research Institute Co., Ltd., Shaanxi (CN); Huaneng Luoyuan Power Generation Co., Ltd, Fujian (CN)

( * ) Notice: Subject to any disclaimer, the term of this patent is extended or adjusted under 35 U.S.C. 154(b) by 74 days.

(21) Appl. No.: 18/533,513

(22) Filed: Dec. 8, 2023

(65) Prior Publication Data
US 2025/0141258 A1 May 1, 2025

Related U.S. Application Data

(63) Continuation of application No. PCT/CN2022/132035, filed on Nov. 15, 2022.

(51) Int. Cl.
*H02J 9/06* (2006.01)
*H02J 3/14* (2006.01)
(Continued)

(52) U.S. Cl.
CPC .............. *H02J 9/062* (2013.01); *H02J 3/144* (2020.01); *H02J 3/28* (2013.01); *H02J 3/38* (2013.01)

(58) Field of Classification Search
CPC .... H02J 9/062; H02J 3/144; H02J 3/28; H02J 3/38
See application file for complete search history.

(56) References Cited

FOREIGN PATENT DOCUMENTS

| CN | 103427470 A | * 12/2013 | |
|----|-------------|-----------|---|
| CN | 111786406 A | * 10/2020 | ............... H02J 3/04 |

(Continued)

OTHER PUBLICATIONS

OA for CN application 202210747856X.
(Continued)

*Primary Examiner* — Rexford N Barnie
*Assistant Examiner* — Thai H Tran
(74) *Attorney, Agent, or Firm* — Maginot, Moore & Beck

(57) ABSTRACT

A thermal-power power electronic direct-hung energy-storage plant backup power system includes a thermal-power grid connection startup/standby unit, a power electronic energy-storage switching unit and a thermal-power plant unit. The thermal-power grid connection startup/standby unit is connected to the power electronic energy-storage switching unit and the thermal-power plant unit, respectively. The power electronic energy-storage switching unit is connected to the thermal-power plant unit. The power electronic energy-storage switching unit includes an energy-storage device, an energy-storage device converting apparatus, an energy-storage device isolation switch, an energy-storage Power Electronic Transformer (PET) low-voltage Alternating Current-Direct Current (AC-DC) converter, an energy-storage PET low-voltage side filter capacitor, an energy-storage PET high-frequency DC-DC transformer, an energy-storage PET high-voltage side filter capacitor, an energy-storage PET high-voltage DC-AC converter, an
(Continued)

energy-storage grid connection switch, a low-voltage standby energy-storage power supply busbar, and a high-voltage standby energy-storage power supply busbar.

9 Claims, 3 Drawing Sheets

(51) Int. Cl.
*H02J 3/28* (2006.01)
*H02J 3/38* (2006.01)

(56) References Cited

FOREIGN PATENT DOCUMENTS

| | | | |
|---|---|---|---|
| CN | 113541137 A | | 10/2021 |
| CN | 113839425 A | * | 12/2021 |
| CN | 216794639 U | | 6/2022 |
| CN | 114825596 A | | 7/2022 |

OTHER PUBLICATIONS

English translation of OA for CN application 202210747856X.
ISR for PCT application PCT/CN2022/132035.
English translation of ISR for PCT application PCT/CN2022/132035.

* cited by examiner

THERMAL-POWER DIRECT-HUNG ENERGY-STORAGE FREQUENCY MODULATION PLANT BACKUP POWER SYSTEM

CROSS REFERENCE TO RELATED APPLICATIONS

This application is a continuation application of International Application No. PCT/CN2022/132035, filed on Nov. 15, 2022, which is based on and claims priority to Chinese patent application No. 202210747856.X, filed on Jun. 29, 2022, the entire contents of which are incorporated herein by reference.

TECHNICAL FIELD

The disclosure relates to the technical field of standby power supply, in particular to a thermal-power power electronic direct-hung energy-storage plant backup power system.

BACKGROUND

As one of the key technical supports for energy transformation, large-scale energy storage technology has received wide attention from the industry in recent years for providing various auxiliary services for power grids, such as peak modulation, frequency modulation and emergency response. The hybrid energy storage system, consisting of electrochemical energy storage and lithium battery, is connected to a thermal-power unit via a converter and has bi-directional power flow capability, which has the advantages of rapid power modulation and diverse application modes. However, since the applicability and operating frequency of the existing transformer connected to the thermal-power unit are relatively low, it is difficult to provide electric power directly as desired, which results in a large amount of power loss.

SUMMARY

A first aspect of embodiments of the disclosure provides a thermal-power power electronic direct-hung energy-storage plant backup power system. The system includes: a thermal-power grid connection startup/standby unit, a power electronic energy-storage switching unit and a thermal-power plant unit, the thermal-power grid connection startup/standby unit being connected to the power electronic energy-storage switching unit and the thermal-power plant unit respectively, and the power electronic energy-storage switching unit being connected to the thermal-power plant unit;

the thermal-power grid connection startup/standby unit including a generator configured to generate electricity;
the power electronic energy-storage switching unit being configured to supply power to the thermal-power plant unit when the generator is shut down due to power loss in the grid;
the thermal-power plant unit including a plant load, the thermal-power plant unit being configured to start the plant load using electrical energy provided by the power electronic energy-storage switching unit; in which
the power electronic energy-storage switching unit includes: an energy-storage device, an energy-storage device converting apparatus, an energy-storage device isolation switch, an energy-storage Power Electronic Transformer (PET) low-voltage Alternating Current-Direct Current (AC-DC) converter, an energy-storage PET low-voltage side filter capacitor, an energy-storage PET high-frequency DC-DC transformer, an energy-storage PET high-voltage side filter capacitor, an energy-storage PET high-voltage DC-AC converter, and an energy-storage grid connection switch,
the power electronic energy-storage switching unit is further configured to supply power to the thermal-power grid connection startup/standby unit when the generator is at no load,
the thermal-power grid connection startup/standby unit further includes: a thermal-power grid connection busbar, a generator main transformer, a split-winding startup/standby transformer, a first branch busbar and a second branch busbar on a low-voltage side of the startup/standby transformer;
the generator is connected to the thermal-power grid connection busbar via the generator main transformer; and
a high-voltage side of the split-winding startup/standby transformer is connected to the thermal-power grid connection busbar, and a low-voltage side of the split-winding startup/standby transformer is connected to the first branch busbar and the second branch busbar on the low-voltage side of the startup/standby transformer, respectively,
the thermal-power plant unit further includes: a high-voltage busbar of a high-voltage plant transformer, a split-winding high-voltage plant transformer, a first branch busbar on a low-voltage side of the high-voltage plant transformer, a second branch busbar on the low-voltage side of the high-voltage plant transformer, a high-voltage first load switch, a high-voltage second load switch, a high-voltage standby power supply switch, a low-voltage plant switch and a low-voltage plant unit; in which
a high-voltage side of the split-winding high-voltage plant transformer is connected to an outlet of the generator via the high-voltage busbar of the high-voltage plant transformer, and a low-voltage side of the split-winding high-voltage plant transformer is connected to the first branch busbar and the second branch busbar on the low-voltage side of the high-voltage plant transformer;
the plant load includes: a thermal-power plant high-voltage class I load, a thermal-power plant high-voltage class II load, and a thermal-power plant low-voltage load;
the thermal-power plant high-voltage class I load is connected to the first branch busbar on the low-voltage side of the high-voltage plant transformer via the high-voltage first load switch;
the thermal-power plant high-voltage class II load is connected to the second branch busbar on the low-voltage side of the high-voltage plant transformer via the high-voltage second load switch;
the high-voltage standby power supply switch is configured to connect the first branch busbar on the low-voltage side of the high-voltage plant transformer to the power electronic energy-storage switching unit;
the low-voltage plant unit is configured to connect to the second branch busbar on the low-voltage side of the high-voltage plant transformer via the low-voltage plant switch; and
the thermal-power plant low-voltage load is connected to the low-voltage plant unit, the low-voltage plant unit includes: a dual-winding low-voltage plant transformer, a plant busbar, a low-voltage standby power supply switch, and a low-voltage load switch; in which
a high-voltage side of the dual-winding low-voltage plant transformer is connected to the second branch busbar on the low-voltage side of the high-voltage plant transformer via the low-voltage plant switch, a low-voltage side of the dual-winding low-voltage plant transformer is connected to the plant busbar;
the thermal-power plant low-voltage load is connected to the plant busbar via the low-voltage load switch; and
the power electronic energy-storage switching unit is connected to the plant busbar via the low-voltage standby power supply switch,
the energy-storage device converting apparatus, the energy-storage device isolation switch, the energy-storage PET low-voltage AC-DC converter, the energy-storage PET low-voltage side filter capacitor, the energy-storage PET high-frequency DC-DC transformer, the energy-storage PET high-voltage side filter capacitor, the energy-storage PET high-voltage DC-AC converter, and the energy-storage grid connection switch are connected sequentially;
the energy-storage device converting apparatus is connected to the energy-storage device;
the energy-storage grid connection switch is connected to a second branch busbar on a low-voltage side of the startup/standby transformer; in which
the energy-storage device converting apparatus is configured to convert a low-voltage DC from the energy-storage device to a low-voltage AC;
the energy-storage PET low-voltage AC-DC converter is configured to convert the low-voltage AC to the low-voltage DC;
the energy-storage PET low-voltage side filter capacitor is configured to filter the low-voltage DC;
the energy-storage PET high-frequency DC-DC transformer is configured to transform the low-voltage DC after the filtering to a high-voltage DC;
the energy-storage PET high-voltage side filter capacitor is configured to filter the high-voltage DC; and
the energy-storage PET high-voltage DC-AC converter is configured to convert the high-voltage DC after the filtering to a high-voltage AC,
the power electronic energy-storage switching unit further includes: a low-voltage standby energy-storage power supply busbar and a high-voltage standby energy-storage power supply busbar;
an end of the low-voltage standby energy-storage power supply busbar is connected to the energy-storage PET low-voltage AC-DC converter, and the other end is connected to the plant busbar via the low-voltage standby power supply switch; and
an end of the high-voltage standby energy-storage power supply busbar is connected to the energy-storage PET high-voltage DC-AC converter, and the other end is connected to the first branch busbar on the low-voltage side of the high-voltage plant transformer via the high-voltage standby power supply switch,
in a case that high-voltage electric energy is required, the energy-storage device outputs the electric energy, the energy-storage device converting apparatus converts the output electric energy from low-voltage DC to low-voltage AC and the energy-storage device isolation switch is switched on, the energy-storage PET low-voltage AC-DC converter converts the low-voltage AC into low-voltage DC, the low-voltage DC is filtered by the energy-storage PET low-voltage side filter capacitor and transmitted to the energy-storage PET high-frequency DC-DC transformer, the energy-storage PET high-frequency DC-DC transformer transforms the low-voltage DC after the filtering into high-voltage DC, the high-voltage DC is filtered by the energy-storage PET high-voltage side filter capacitor and transmitted to the energy-storage PET high-voltage DC-AC converter, the energy-storage PET high-voltage DC-AC converter converts the high-voltage DC after the filtering into high-voltage AC, the high-voltage AC is transmitted to the second branch busbar on the low-voltage side of the startup/standby transformer via the energy-storage grid connection switch, or the high-voltage AC is connected to the thermal-power plant unit via the high-voltage standby energy-storage power supply busbar;
in a case that low-voltage electric energy is required, the energy-storage device outputs electric energy, the energy-storage device converting apparatus converts the output electric energy from low-voltage DC to low-voltage AC and the energy-storage device isolation switch is switched on, the low-voltage AC is connected to the thermal-power plant unit via the low-voltage standby energy-storage power supply busbar.

Additional aspects and advantages of the disclosure will be given in part in the following descriptions, become apparent in part from the following descriptions, or be learned from the practice of the disclosure.

BRIEF DESCRIPTION OF THE DRAWINGS

The foregoing and/or additional aspects and advantages of the disclosure will become apparent and readily understood from the following description of the embodiments in combination with the accompanying drawings, in which.

Figure 1:
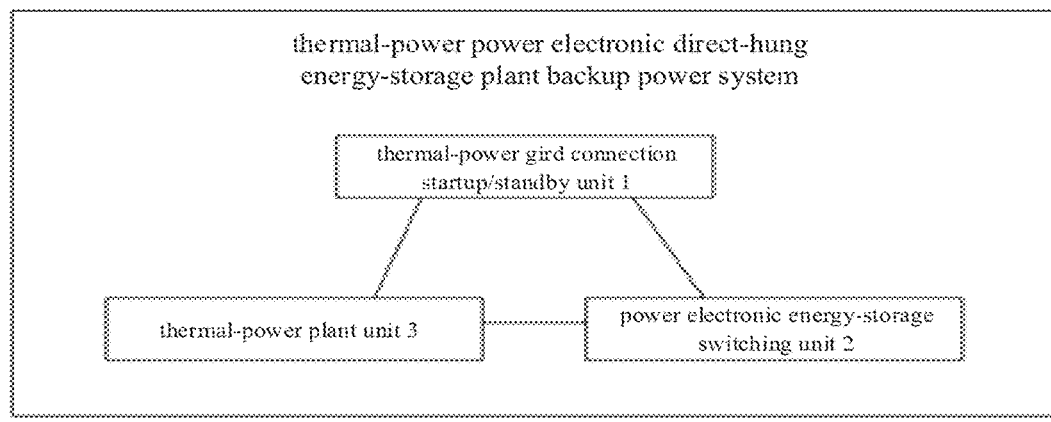
FIG. 1 is a block diagram of a thermal-power power electronic direct-hung energy-storage plant backup power system according to an embodiment of the disclosure.

DESCRIPTION OF REFERENCE NUMBERS thermal-power grid connection startup/standby unit 1, power electronic energy-storage switching unit 2, thermal-power plant unit 3, generator 1-1, thermal-power grid connection busbar 1-2, generator main transformer 1-3, split-winding startup/standby transformer 1-4, first branch busbar 1-5 on a low-voltage side of the startup/standby transformer, second branch busbar 1-6 on the low-voltage side of the startup/standby transformer, energy storage device 2-1, energy-storage device converting apparatus 2-2, energy-storage device isolation switch 2-3, energy-storage PET low-voltage AC-DC converter 2-4, energy-storage PET low-voltage side filter capacitor 2-5, energy-storage PET high-frequency DC-DC transformer 2-6, energy-storage PET high-voltage side filter capacitor 2-7, energy-storage PET high-voltage DC-AC converter 2-8, energy-storage grid connection switch 2-9, low-voltage standby energy-storage power supply busbar 2-10, high-voltage standby energy-storage power supply busbar 2-11, plant load 3-1, high-voltage busbar of a high-voltage plant transformer 3-2, split-winding high-voltage plant transformer 3-3, first branch busbar 3-4 on a low-voltage side of the high-voltage plant transformer, second branch busbar 3-5 on the low-voltage side of the high-voltage plant transformer, high-voltage first load switch 3-6, high-voltage second load switch 3-7, high-voltage standby power supply switch 3-8, low-voltage plant switch 3-9, low-voltage plant unit 3-10, thermal-power plant high-voltage class I load 3-1-1, thermal-power plant high-voltage class II load 3-1-2, thermal-power plant low-voltage load 3-1-3, dual-winding low-voltage plant transformer 3-10-1, plant busbar 3-10-2, low-voltage standby power supply switch 3-10-3, and low-voltage load switch 3-10-4.

DETAILED DESCRIPTION

Embodiments of the disclosure are described in detail below, and examples of the embodiments are shown in the accompanying drawings, in which the same or similar numbers indicate the same or similar components or components having the same or similar functions. The embodiments described below with reference to the accompanying drawings are exemplary, and are intended to be used to explain the disclosure and are not to be construed as limiting the disclosure.

The disclosure provides a thermal-power power electronic direct-hung energy-storage plant backup power system. The system includes: a thermal-power grid connection startup/standby unit, a power electronic energy-storage switching unit and a thermal-power plant unit. The thermal-power grid connection startup/standby unit is connected to the power electronic energy-storage switching unit and the thermal-power plant unit, respectively, and the power electronic energy-storage switching unit is connected to the thermal-power plant unit. The thermal-power grid connection startup/standby unit includes a generator configured to generate electricity. The power electronic energy-storage switching unit is configured to supply power to the thermal-power plant unit when the generator is shut down due to power loss in the grid. The thermal-power plant unit includes a plant load, and the thermal-power plant unit is configured to start the plant load using electrical energy provided by the power electronic energy-storage switching unit. The power electronic energy-storage switching unit includes: an energy-storage device, an energy-storage device converting apparatus, an energy-storage device isolation switch, an energy-storage PET low-voltage AC-DC converter, an energy-storage PET low-voltage side filter capacitor, an energy-storage PET high-frequency DC-DC transformer, an energy-storage PET high-voltage side filter capacitor, an energy-storage PET high-voltage DC-AC converter, and an energy-storage grid connection switch. In the solution of the disclosure, the energy storage device is directly hung on the low-voltage side of the startup/standby transformer via the PET in the power electronic energy-storage switching unit, and can be used as a standby power supply for 6 kV plant load. Alternatively, the PET is isolated due to the flexible voltage modulation characteristic, and the energy storage is used as a standby power supply for 400V plant load via the converting apparatus.

A thermal-power power electronic direct-hung energy-storage plant backup power system of the embodiments of the disclosure is described below with reference to the accompanying drawings.

Embodiment 1

FIG. 1 is a block diagram of a thermal-power power electronic direct-hung energy-storage plant backup power system according to an embodiment of the disclosure. As shown in FIG. 1, the system includes: a thermal-power grid connection startup/standby unit 1, a power electronic energy-storage switching unit 2 and a thermal-power plant unit 3. The thermal-power grid connection startup/standby unit 1 is connected to the power electronic energy-storage switching unit 2 and the thermal-power plant unit 3 respectively, and the power electronic energy-storage switching unit 2 is connected to the thermal-power plant unit 3.

In the embodiment of the disclosure, the thermal-power grid connection startup/standby unit 1 includes a generator 1-1 configured to generate electricity.

The power electronic energy-storage switching unit 2 is configured to supply power to the thermal-power plant unit 3 when the generator 1-1 is shut down due to power loss in the grid.

The thermal-power plant unit 3 includes a plant load 3-1, and the thermal-power plant unit 3 is configured to start the plant load 3-1 using electrical energy provided by the power electronic energy-storage switching unit 2.

Figure 2:
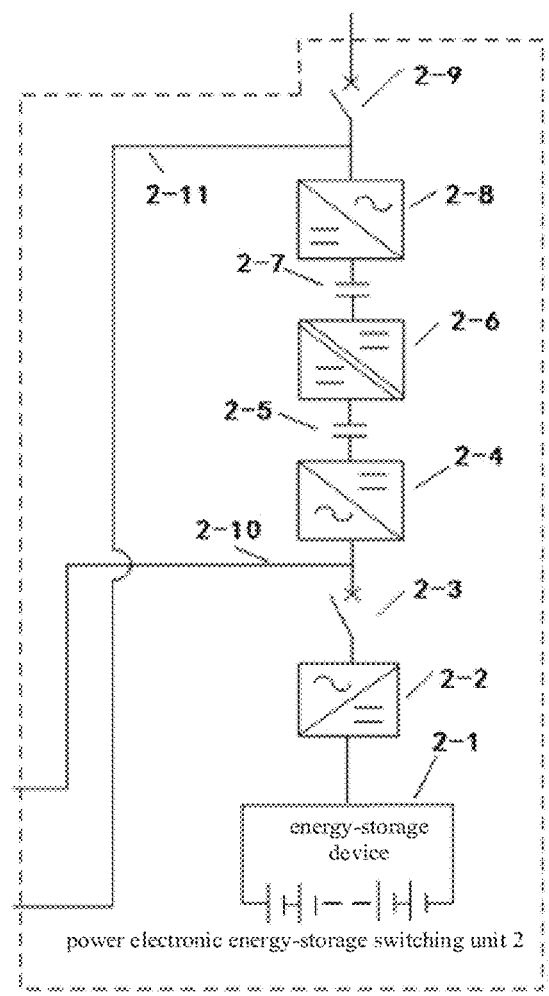
FIG. 2 is a schematic diagram of a power electronic energy-storage switching unit according to an embodiment of the disclosure.

As shown in FIG. 2, the power electronic energy-storage switching unit 2 includes: an energy-storage device 2-1, an energy-storage device converting apparatus 2-2, an energy-storage device isolation switch 2-3, an energy-storage PET low-voltage AC-DC converter 2-4, an energy-storage PET low-voltage side filter capacitor 2-5, an energy-storage PET high-frequency DC-DC transformer 2-6, an energy-storage PET high-voltage side filter capacitor 2-7, an energy-storage PET high-voltage DC-AC converter 2-8, and an energy-storage grid connection switch 2-9.

The energy-storage device converting apparatus 2-2, the energy-storage device isolation switch 2-3, the energy-storage PET low-voltage AC-DC converter 2-4, the energy-storage PET low-voltage side filter capacitor 2-5, the energy-storage PET high-frequency DC-DC transformer 2-6, the energy-storage PET high-voltage side filter capacitor 2-7, the energy-storage PET high-voltage DC-AC converter 2-8, and the energy-storage grid connection switch 2-9 are connected sequentially.

The energy-storage device converting apparatus 2-2 is connected to the energy-storage device 2-1.

The energy-storage grid connection switch 2-9 is connected to a second branch busbar 1-6 on a low-voltage side of the startup/standby transformer.

The energy-storage device converting apparatus 2-2 is configured to convert a low-voltage DC from the energy-storage device 2-1 to a low-voltage AC.

The energy-storage PET low-voltage AC-DC converter 2-4 is configured to convert the low-voltage AC to the low-voltage DC.

The energy-storage PET low-voltage side filter capacitor 2-5 is configured to filter the low-voltage DC.

The energy-storage PET high-frequency DC-DC transformer 2-6 is configured to transform the low-voltage DC after the filtering to a high-voltage DC.

The energy-storage PET high-voltage side filter capacitor 2-7 is configured to filter the high-voltage DC.

The energy-storage PET high-voltage DC-AC converter 2-8 is configured to convert the high-voltage DC after the filtering to a high-voltage AC.

After the energy-storage device 2-1 outputs the electric energy, the energy-storage device converting apparatus 2-2 converts the output electric energy from low-voltage DC to low-voltage AC, and the energy-storage device isolation switch 2-3 is switched on. When high-voltage electric energy needs to be provided, the energy-storage PET low-voltage AC-DC converter 2-4 converts the low-voltage AC into low-voltage DC. Then the low-voltage DC is filtered by the energy-storage PET low-voltage side filter capacitor 2-5 and transmitted to the energy-storage PET high-frequency DC-DC transformer 2-6, the energy-storage PET high-frequency DC-DC transformer 2-6 transforms the low-voltage DC after the filtering into high-voltage DC. The energy-storage PET high-voltage side filter capacitor 2-7 filters the high-voltage DC and transmit it to the energy-storage PET high-voltage DC-AC converter 2-8. The energy-storage PET high-voltage DC-AC converter 2-8 converts the filtered high-voltage DC into high-voltage AC, and the high-voltage AC is transmitted to the second branch busbar 1-6 on the low-voltage side of the startup/standby transformer via the energy-storage grid connection switch 2-9. Alternatively, the high-voltage AC is connected to the thermal-power plant unit 3 via the high-voltage standby energy-storage power supply busbar 2-11. When low-voltage electric energy is needed, the energy-storage device 2-1 outputs electric energy, the energy-storage device converting apparatus 2-2 converts the output electric energy from low-voltage DC to low-voltage AC, and the energy-storage device isolation switch 2-3 is switched on. The low-voltage AC is connected to the thermal-power plant unit 3 via the low-voltage standby energy-storage power supply busbar 2-10.

In the embodiment of the disclosure, the power electronic energy-storage switching unit 2 is further configured to supply power to the thermal-power grid connection startup/standby unit 1 when the generator 1-1 is at no load.

When the generator 1-1 is at no load due to power loss in the grid, the voltage of the thermal-power grid connection busbar 1-2 in the thermal-power grid connection startup/standby unit 1 drops rapidly. In order to restore the power supply of the thermal-power unit, the energy-storage grid connection switch 2-9 in the power electronic energy-storage switching unit 2 is closed, and the split-winding startup/standby transformer 1-4 is used to supply power to the generator 1-1, so that the operation of the thermal-power unit is restored.

The power-storage PET, consisting of the energy-storage PET high-voltage DC-AC converter 2-8, the energy-storage PET high-voltage side filter capacitor 2-7, the energy-storage PET high-frequency DC-DC transformer 2-6, the energy-storage PET low-voltage side filter capacitor 2-5 and the energy-storage PET low-voltage AC-DC converter 2-4, is used for voltage transformation and is configured to transmit the transformed electric energy to the thermal-power grid connection startup/standby unit 1. Compared with the traditional low-frequency transformer, the high-frequency electromagnetic coupling technology is adopted, which can not only realize the functions of the traditional transformer, such as voltage level transformation and isolation, but also allow for flexible voltage transformation, thereby effectively reducing the occupied area and volume of the transformer. The PET and the energy-storage device converting apparatus 2-2 both adopt high-power and high-frequency insulated gate bipolar transistor components.

Figure 3:
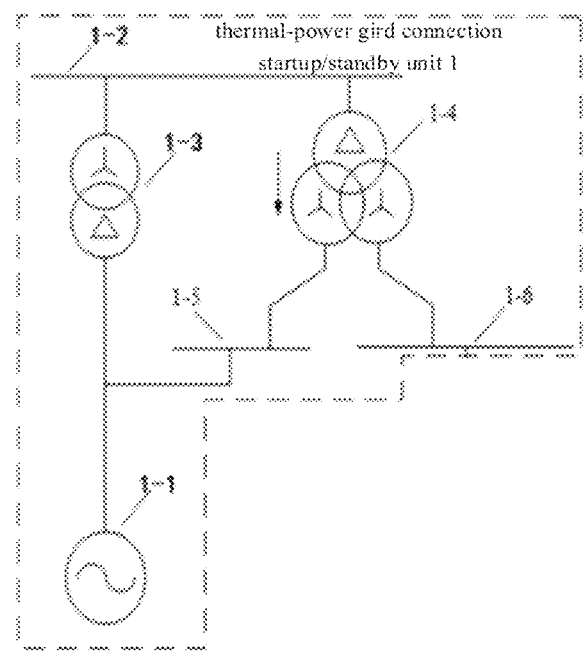
FIG. 3 is a schematic diagram of a thermal-power grid connection startup/standby unit according to an embodiment of the disclosure.

It should be noted that as shown in FIG. 3, in addition to the generator 1-1, the thermal-power grid connection startup/standby unit 1 further includes: a thermal-power grid connection busbar 1-2, a generator main transformer 1-3, a split-winding startup/standby transformer 1-4, a first branch busbar 1-5 on the low-voltage side of the startup/standby transformer, and a second branch busbar 1-6 on the low-voltage side of the startup/standby transformer.

The generator 1-1 is connected to the thermal-power grid connection busbar 1-2 via the generator main transformer 1-3. The generator 1-1 can perform power transmission with the thermal-power grid connection busbar 1-2 via the generator main transformer 1-3.

A high-voltage side of the split-winding startup/standby transformer 1-4 is connected to the thermal-power grid connection busbar 1-2, and a low-voltage side of the split-winding startup/standby transformer 1-4 is connected to the first branch busbar 1-5 and the second branch busbar 1-6 on the low-voltage side of the startup/standby transformer, respectively.

Figure 4:
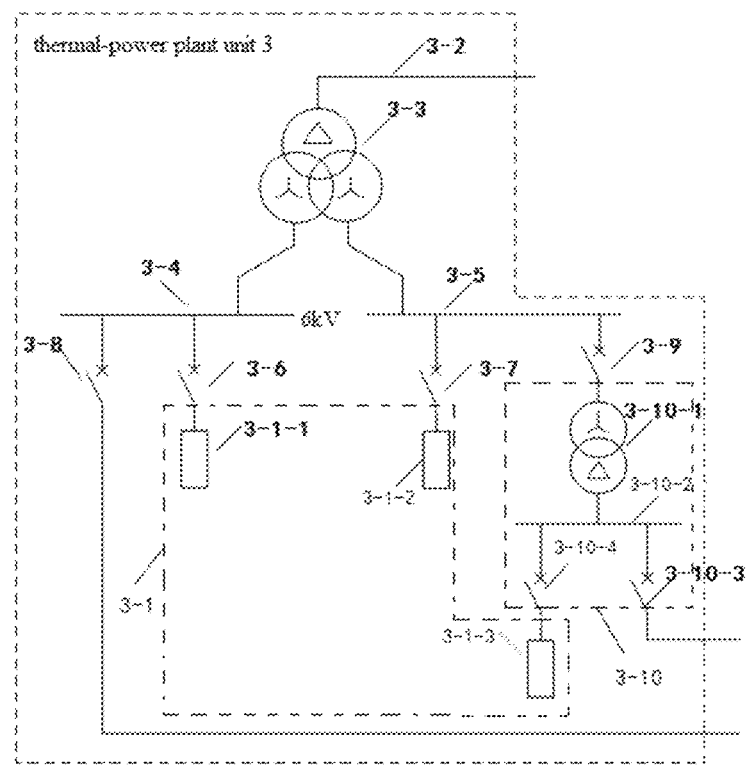
FIG. 4 is a schematic diagram of a thermal-power plant unit according to an embodiment of the disclosure.

In the embodiment of the disclosure, as shown in FIG. 4, in addition to the plant load 3-1, the thermal-power plant unit 3 further includes: a high-voltage busbar 3-2 of a high-voltage plant transformer, a split-winding high-voltage plant transformer 3-3, a first branch busbar 3-4 on a low-voltage side of the high-voltage plant transformer, a second branch busbar 3-5 on the low-voltage side of the high-voltage plant transformer, a high-voltage first load switch 3-6, a high-voltage second load switch 3-7, a high-voltage standby power supply switch 3-8, a low-voltage plant switch 3-9 and a low-voltage plant unit 3-10.

A high-voltage side of the split-winding high-voltage plant transformer 3-3 is connected to an outlet of the generator 1-1 via the high-voltage busbar 3-2 of the high-voltage plant transformer, and a low-voltage side of the split-winding high-voltage plant transformer 3-3 is connected to the first branch busbar 3-4 and the second branch busbar 3-5 on the low-voltage side of the high-voltage plant transformer. The split-winding high-voltage plant transformer 3-3 can be used to reduce the output voltage of the generator 1-1 from 20 kV to 6 kV.

The plant load 3-1 includes: a thermal-power plant high-voltage class I load 3-1-1, a thermal-power plant high-voltage class II load 3-1-2, and a thermal-power plant low-voltage load 3-1-3.

The thermal-power plant high-voltage class I load 3-1-1 is connected to the first branch busbar 3-4 on the low-voltage side of the high-voltage plant transformer via the high-voltage first load switch 3-6.

The thermal-power plant high-voltage class II load 3-1-2 is connected to the second branch busbar 3-5 on the low-voltage side of the high-voltage plant transformer via the high-voltage second load switch 3-7.

Figure 5:
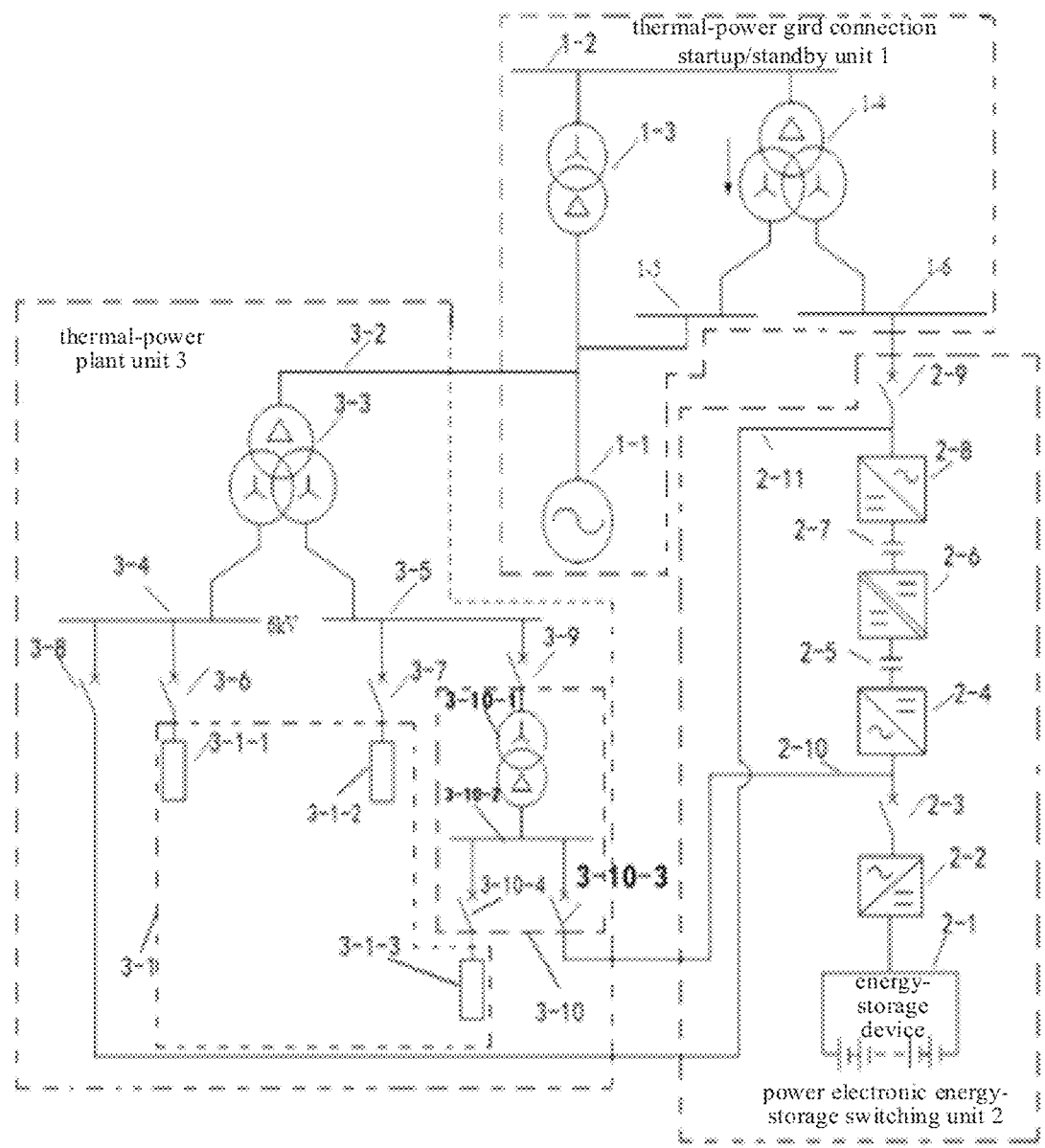
FIG. 5 is a schematic diagram of a thermal-power power electronic direct-hung energy-storage plant backup power system according to an embodiment of the disclosure.

The high-voltage standby power supply switch 3-8 is configured to connect the first branch busbar 3-4 on the low-voltage side of the high-voltage plant transformer to the power electronic energy-storage switching unit 2, as shown in FIG. 5.

By closing the high-voltage first load switch 3-6, the first branch busbar 3-4 on the low-voltage side of the high-voltage plant transformer can supply power to the thermal-power plant high-voltage class I load 3-1-1. By closing the high-voltage second load switch 3-7, the second branch busbar 3-5 on the low-voltage side of the high-voltage plant transformer can supply power to the thermal-power plant high-voltage class II load 3-1-2.

When the generator 1-1 is shut down due to loss of power in the grid, the high-voltage standby power supply switch 3-8 is closed for supplying power to the first branch busbar 3-4 and the second branch busbar 3-5 on the low-voltage side of the high-voltage plant transformer.

The low-voltage plant unit 3-10 is configured to connect to the second branch busbar 3-5 on the low-voltage side of the high-voltage plant transformer via the low-voltage plant switch 3-9.

The thermal-power plant low-voltage load 3-1-3 is connected to the low-voltage plant unit 3-10.

The low-voltage plant unit 3-10 includes: a dual-winding low-voltage plant transformer 3-10-1, a plant busbar 3-10-2, a low-voltage standby power supply switch 3-10-3, and a low-voltage load switch 3-10-4.

A high-voltage side of the dual-winding low-voltage plant transformer 3-10-1 is connected to the second branch busbar 3-5 on the low-voltage side of the high-voltage plant transformer via the low-voltage plant switch 3-9, a low-voltage side of the dual-winding low-voltage plant transformer 3-10-1 is connected to the plant busbar 3-10-2.

The thermal-power plant low-voltage load 3-1-3 is connected to the plant busbar via the low-voltage load switch 3-10-4.

The power electronic energy-storage switching unit 2 is connected to the plant busbar 3-10-2 via the low-voltage standby power supply switch 3-10-3, as shown in FIG. 5.

In some embodiments, the energy-storage device converting apparatus 2-2, the energy-storage device isolation switch 2-3, the energy-storage PET low-voltage AC-DC converter 2-4, the energy-storage PET low-voltage side filter capacitor 2-5, the energy-storage PET high-frequency DC-DC transformer 2-6, the energy-storage PET high-voltage side filter capacitor 2-7, the energy-storage PET high-voltage DC-AC converter 2-8, and the energy-storage grid connection switch 2-9 are connected sequentially.

The energy-storage device converting apparatus 2-2 is connected to the energy-storage device 2-1.

In some embodiments, the high-voltage side of the energy-storage PET high-frequency DC-DC transformer 2-6 is connected to the DC side of the energy-storage PET high-voltage DC-AC converter 2-8 via the energy-storage PET high-voltage side filter capacitor 2-7. The DC side of the energy-storage PET low-voltage AC-DC converter 2-4 is connected to the low-voltage side of the energy-storage PET high-frequency DC-DC transformer 2-6 via the energy-storage PET low-voltage side filter capacitor 2-5. The AC side of the energy-storage device converting apparatus 2-2 is connected to the AC side of the energy-storage PET low-voltage AC-DC converter 2-4 via the energy-storage device isolation switch 2-3. The energy-storage device 2-1 is connected to the DC side of the energy-storage device converting apparatus 2-2.

In the embodiment of the disclosure, the energy-storage grid connection switch 2-9 is connected to the second branch busbar 1-6 on the low-voltage side of the startup/standby transformer, as shown in FIG. 5.

In some embodiments, the power electronic energy-storage switching unit 2 further includes: a low-voltage standby energy-storage power supply busbar 2-10 and a high-voltage standby energy-storage power supply busbar 2-11.

An end of the low-voltage standby energy-storage power supply busbar 2-10 is connected to the energy-storage PET low-voltage AC-DC converter 2-4, and the other end is connected to the plant busbar 3-10-2 via the low-voltage standby power supply switch 3-10-3, as shown in FIG. 5.

An end of the high-voltage standby energy-storage power supply busbar 2-11 is connected to the energy-storage PET high-voltage DC-AC converter 2-8, and the other end is connected to the first branch busbar 3-4 on the low-voltage side of the high-voltage plant transformer via the high-voltage standby power supply switch 3-8, as shown in FIG. 5.

It is to be noted that the power electronic energy-storage switching unit 2 is further configured to close the energy-storage grid connection switch 2-9 for frequency modulation according to a frequency modulation command during normal operation of the generator 1-1.

The energy-storage device converting apparatus 2-2 is controlled to adjust the operating state of the energy-storage device 2-1 in response to the frequency modulation command. When controlling the energy-storage device converting apparatus 2-2, a droop control method can be used to achieve active or reactive power decoupling control.

In some embodiments, when using the droop control method to achieve active and reactive power decoupling control, droop control of active-angle frequency and reactive-voltage can be achieved according to the following equation:

$$\begin{cases} \omega = \omega_0 - mP \\ U = U_0 - nQ \end{cases}$$

where, ω is an output voltage angle frequency of the energy-storage device converting apparatus; U is an output voltage amplitude of the energy-storage device converting apparatus; $\omega_0$ is a no-load output voltage angle frequency reference value of the energy-storage device converting apparatus; $U_0$ is a no-load output voltage amplitude reference value of the energy-storage device converting apparatus; m is an active power droop factor; n is a reactive power droop factor; P is an active power allocated to the load connected to the energy-storage device converting apparatus; and Q is a reactive power allocated to the load connected to the energy-storage device converting apparatus.

It is noted that the power electronic energy-storage switching unit 2 is further configured to: in response to requiring the energy-storage device to provide power to the thermal-power plant high-voltage class I load or the thermal-power plant high-voltage class II load in the thermal-power plant unit 3, disconnect the energy-storage grid connection switch 2-9, and provide high-voltage electrical energy to the thermal-power plant high-voltage class I load 3-1-1 or the thermal-power plant high-voltage class II load 3-1-2.

The power electronic energy-storage switching unit 2 is further configured to: in response to requiring the energy-storage device to provide power to the thermal-power plant low-voltage load 3-1-3 in the thermal-power plant unit 3, disconnect the energy-storage grid connection switch 2-9, and provide low-voltage electrical energy to the thermal-power plant low-voltage load 3-1-13.

For example, when the thermal-power plant low-voltage load 3-1-3 in the thermal-power plant unit 3 needs energy-storage power supply, the energy-storage grid connection switch 2-9 and the high-voltage standby power supply switch 3-8 are disconnected, the low-voltage standby power supply switch 3-10-3 is closed. The PET is isolated due to the flexible voltage modulation characteristic, and the energy-storage device 2-1 is used as a backup power source for the thermal-power plant low-voltage load 3-1-3 via the energy-storage device converting apparatus 2-2.

It should be noted that a locking switch is provided among the energy-storage grid connection switch 2-9, the high-voltage standby power supply switch 3-8, and the low-voltage standby power supply switch 3-10-3.

For example, when the energy-storage grid connection switch 2-9 is closed, the high-voltage standby power supply switch 3-8 and the low-voltage plant switch 3-9 are in a locking state and remain disconnected.

When the high-voltage standby power supply switch 3-8 is closed, the energy-storage grid connection switch 2-9 and the low-voltage plant switch 3-9 are in a locking state and remain disconnected.

When the low-voltage plant switch 3-9 is closed, the energy-storage grid connection switch 2-9 and the high-voltage standby power supply switch 3-8 are in a locking state and remain disconnected, which prevents simultaneous connection state causing closed-loop operation and damage to the energy-storage device 2-1.

It is noted that the thermal-power grid connection startup/standby unit 1 further includes: an auxiliary machine matching the generator 1-1. The auxiliary machine includes: a water circulating pump, an oil circulating pump, a coal mill and a boiler. The auxiliary machine is configured to convert coal into mechanical energy, and the generator is configured to convert the mechanical energy into the electrical energy. The auxiliary machine and the generator 1-1 together form a thermal-power unit. If there is a loss of power in the grid, the auxiliary machine is shut down, and thus the generator is shut down, i.e., the thermal-power unit is shut down.

The electric energy generated by the thermal-power grid connection startup/standby unit 1 provides the load on the user side via the transmission line, and the electric energy generated by the thermal-power grid connection startup/standby unit 1 can also be provided to the plant load 3-1 in the thermal-power plant unit 3.

It should be noted that the high voltage mentioned above is 6 KV, and the low voltage is 400V.

For example, when the energy-storage device 2-1 and the thermal-power unit respond to the power grid frequency command together, the energy-storage grid connection switch 2-9 is closed, and the high-voltage standby power supply switch 3-8 and the low-voltage plant switch 3-9 are locked and cannot be closed, and remain in the disconnected state.

When the energy storage device 2-1 is required to supply power to the plant load of 400V, i.e., the thermal-power plant low-voltage load 3-1-3, the energy-storage grid connection switch 2-9 and the high-voltage standby power supply switch 3-8 are disconnected, so that the energy storage device 2-1 can supply power to the plant load of 400V.

When the energy storage device is required to supply power to the plant load of 6 kV, i.e., the thermal-power plant high-voltage class I load 3-1-1 or the thermal-power plant high-voltage class II load 3-1-2, the energy-storage grid connection switch 2-9 and the low-voltage plant switch 3-9 are disconnected, so that the energy storage device 2-1 can supply power to the plant load of 6 kV.

In conclusion, the embodiments provide a thermal-power power electronic direct-hung energy-storage plant backup power system. The system includes: a thermal-power grid connection startup/standby unit, a power electronic energy-storage switching unit and a thermal-power plant unit. The thermal-power grid connection startup/standby unit is connected to the power electronic energy-storage switching unit and the thermal-power plant unit respectively. The thermal-power grid connection startup/standby unit includes a generator configured to generate electricity. The power electronic energy-storage switching unit is configured to supply power to the thermal-power plant unit when the generator is shut down due to power loss in the grid. The thermal-power plant unit includes a plant load, and the thermal-power plant unit is configured to start the plant load using electrical energy provided by the power electronic energy-storage switching unit. The power electronic energy-storage switching unit includes: an energy-storage device, an energy-storage device converting apparatus, an energy-storage device isolation switch, an energy-storage PET low-voltage AC-DC converter, an energy-storage PET low-voltage side filter capacitor, an energy-storage PET high-frequency DC-DC transformer, an energy-storage PET high-voltage side filter capacitor, an energy-storage PET high-voltage DC-AC converter, and an energy-storage grid connection switch. The PET in the technical solution proposed in the disclosure is less expensive compared to the traditional operating-frequency transformer, and the power change in response to the unit frequency modulation is faster and more accurate compared to the traditional operating-frequency transformer. Moreover, the configuration of filter capacitors in the PET can achieve fault isolation between ports, and there is no need to configure harmonic suppression and reactive power compensation devices. In some embodiments, the PET and the energy-storage device converting apparatus both use high-power and high-frequency insulated gate bipolar transistor components, to achieve unit power factor operation or real-time power regulation requirements according to the power load.

Reference throughout this specification to "an embodiment," "some embodiments," "an example," "a specific example," or "some examples," means that a particular feature, structure, material, or characteristic described in combination with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Any process or method described in a flowchart or described herein in other ways may be understood to include one or more modules, segments or portions of codes of executable instructions for achieving specific logical functions or steps in the process, and the scope of a preferred embodiment of the disclosure includes other implementations, which may be performed in the order shown or discussed, including performing functions in a substantially simultaneous manner or in the reverse order, depending on the functions involved, as should be understood by those skilled in the art to which embodiments of the disclosure belong.

Although embodiments of disclosure have been shown and described above, it should be understood that above embodiments are exemplary, and cannot be understood as limiting the disclosure. For those skilled in the art, changes, modifications, substitutions, and variations can be made to the embodiments within the scope of the disclosure.

What is claimed is:

1. A thermal-power power electronic direct-hung energy-storage plant backup power system comprising: a thermal-power grid connection startup/standby unit, a power electronic energy-storage switching unit and a thermal-power plant unit, the thermal-power grid connection startup/standby unit being connected to the power electronic energy-storage switching unit and the thermal-power plant unit respectively, and the power electronic energy-storage switching unit being connected to the thermal-power plant unit;

the thermal-power grid connection startup/standby unit comprising a generator configured to generate electricity;

the power electronic energy-storage switching unit being configured to supply power to the thermal-power plant unit when the generator is shut down due to power loss in the grid;

the thermal-power plant unit comprising a plant load, the thermal-power plant unit being configured to start the plant load using electrical energy provided by the power electronic energy-storage switching unit; wherein the power electronic energy-storage switching unit comprises: an energy-storage device, an energy-storage device converting apparatus, an energy-storage device isolation switch, an energy-storage Power Electronic Transformer (PET) low-voltage Alternating Current-Direct Current (AC-DC) converter, an energy-storage PET low-voltage side filter capacitor, an energy-storage PET high-frequency DC-DC transformer, an energy-storage PET high-voltage side filter capacitor, an energy-storage PET high-voltage DC-AC converter, and an energy-storage grid connection switch, wherein the power electronic energy-storage switching unit is further configured to supply power to the thermal-power grid connection startup/standby unit when the generator is at no load, the thermal-power grid connection startup/standby unit further comprises: a thermal-power grid connection busbar, a generator main transformer, a split-winding startup/standby transformer, a first branch busbar and a second branch busbar on a low-voltage side of the startup/standby transformer;

the generator is connected to the thermal-power grid connection busbar via the generator main transformer; and a high-voltage side of the split-winding startup/standby transformer is connected to the thermal-power grid connection busbar, and a low-voltage side of the split-winding startup/standby transformer is connected to the first branch busbar and the second branch busbar on the low-voltage side of the startup/standby transformer, respectively, wherein the thermal-power plant unit further comprises a high-voltage busbar of a high-voltage plant transformer, a split-winding high-voltage plant transformer, a first branch busbar on a low-voltage side of the high-voltage plant transformer, a second branch busbar on the low-voltage side of the high-voltage plant transformer, a high-voltage first load switch, a high-voltage second load switch, a high-voltage standby power supply switch, a low-voltage plant switch and a low-voltage plant unit;

a high-voltage side of the split-winding high-voltage plant transformer is connected to an outlet of the generator via the high-voltage busbar of the high-voltage plant transformer, and a low-voltage side of the split-winding high-voltage plant transformer is connected to the first branch busbar and the second branch busbar on the low-voltage side of the high-voltage plant transformer;

the plant load comprises a thermal-power plant high-voltage class I load, a thermal-power plant high-voltage class II load, and a thermal-power plant low-voltage load;

the thermal-power plant high-voltage class I load is connected to the first branch busbar on the low-voltage side of the high-voltage plant transformer via the high-voltage first load switch;

the thermal-power plant high-voltage class II load is connected to the second branch busbar on the low-voltage side of the high-voltage plant transformer via the high-voltage second load switch;

the high-voltage standby power supply switch is configured to connect the first branch busbar on the low-voltage side of the high-voltage plant transformer to the power electronic energy-storage switching unit;

the low-voltage plant unit is configured to connect to the second branch busbar on the low-voltage side of the high-voltage plant transformer via the low-voltage plant switch; and the thermal-power plant low-voltage load is connected to the low-voltage plant unit, wherein the low-voltage plant unit comprises a dual-winding low-voltage plant transformer, a plant busbar, a low-voltage standby power supply switch, and a low-voltage load switch;

a high-voltage side of the dual-winding low-voltage plant transformer is connected to the second branch busbar on the low-voltage side of the high-voltage plant transformer via the low-voltage plant switch, a low-voltage side of the dual-winding low-voltage plant transformer is connected to the plant busbar;

the thermal-power plant low-voltage load is connected to the plant busbar via the low-voltage load switch; and the power electronic energy-storage switching unit is connected to the plant busbar via the low-voltage standby power supply switch, wherein the energy-storage device converting apparatus, the energy-storage device isolation switch, the energy-storage PET low-voltage AC-DC converter, the energy-storage PET low-voltage side filter capacitor, the energy-storage PET high-frequency DC-DC transformer, the energy-storage PET high-voltage side filter capacitor, the energy-storage PET high-voltage DC-AC converter, and the energy-storage grid connection switch are connected sequentially;

the energy-storage device converting apparatus is connected to the energy-storage device;

the energy-storage grid connection switch is connected to the second branch busbar on the low-voltage side of the startup/standby transformer; wherein the energy-storage device converting apparatus is configured to convert a low-voltage DC from the energy-storage device to a low-voltage AC;

the energy-storage PET low-voltage AC-DC converter is configured to convert the low-voltage AC to the low-voltage DC;

the energy-storage PET low-voltage side filter capacitor is configured to filter the low-voltage DC;

the energy-storage PET high-frequency DC-DC transformer is configured to transform the low-voltage DC after the filtering to a high-voltage DC;

the energy-storage PET high-voltage side filter capacitor is configured to filter the high-voltage DC; and the energy-storage PET high-voltage DC-AC converter is configured to convert the high-voltage DC after the filtering to a high-voltage AC, wherein the power electronic energy-storage switching unit further comprises: a low-voltage standby energy-storage power supply busbar and a high-voltage standby energy-storage power supply busbar;

an end of the low-voltage standby energy-storage power supply busbar is connected to the energy-storage PET low-voltage AC-DC converter, and the other end is connected to the plant busbar via the low-voltage standby power supply switch; and an end of the high-voltage standby energy-storage power supply busbar is connected to the energy-storage PET high-voltage DC-AC converter, and the other end is connected to the first branch busbar on the low-voltage side of the high-voltage plant transformer via the high-voltage standby power supply switch, wherein, in a case that high-voltage electric energy is required, the energy-storage device outputs the electric energy, the energy-storage device converting apparatus converts the output electric energy from low-voltage DC to low-voltage AC and the energy-storage device isolation switch is switched on, the energy-storage PET low-voltage AC-DC converter converts the low-voltage AC into low-voltage DC, the low-voltage DC is filtered by the energy-storage PET low-voltage side filter capacitor and transmitted to the energy-storage PET high-frequency DC-DC transformer, the energy-storage PET high-frequency DC-DC transformer transforms the low-voltage DC after the filtering into high-voltage DC, the high-voltage DC is filtered by the energy-storage PET high-voltage side filter capacitor and transmitted to the energy-storage PET high-voltage DC-AC converter, the energy-storage PET high-voltage DC-AC converter converts the high-voltage DC after the filtering into high-voltage AC, the high-voltage AC is transmitted to the second branch busbar on the low-voltage side of the startup/standby transformer via the energy-storage grid connection switch, or the high-voltage AC is connected to the thermal-power plant unit via the high-voltage standby energy-storage power supply busbar;

in a case that low-voltage electric energy is required, the energy-storage device outputs electric energy, the energy-storage device converting apparatus converts the output electric energy from low-voltage DC to low-voltage AC and the energy-storage device isolation switch is switched on, the low-voltage AC is connected to the thermal-power plant unit via the low-voltage standby energy-storage power supply busbar.

2. The system of claim 1, wherein a high-voltage side of the energy-storage PET high-frequency DC-DC transformer is connected to a DC side of the energy-storage PET high-voltage DC-AC converter via the energy-storage PET high-voltage side filter capacitor;

a DC side of the energy-storage PET low-voltage AC-DC converter is connected to a low-voltage side of the energy-storage PET high-frequency DC-DC transformer via the energy-storage PET low-voltage side filter capacitor;

an AC side of the energy-storage device converting apparatus is connected to an AC side of the energy-storage PET low-voltage AC-DC converter via the energy-storage device isolation switch; and the energy-storage device is connected to a DC side of the energy-storage device converting apparatus.

3. The system of claim 1, wherein the power electronic energy-storage switching unit is further configured to close the energy-storage grid connection switch for frequency modulation according to a frequency modulation command during normal operation of the generator.

4. The system of claim 3, wherein closing the energy-storage grid connection switch for frequency modulation according to the frequency modulation command comprises: adjusting an operating state of the energy-storage device by controlling the energy-storage device converting apparatus in response to the frequency modulation command, wherein the energy-storage device converting apparatus is controlled using droop control.

5. The system of claim 4, wherein when using the droop control, the droop control of active-angle frequency and reactive-voltage is achieved according to the following equation:

$$\begin{cases} \omega = \omega_0 - mP \\ U = U_0 - nQ \end{cases}$$

where, $\omega$ is an output voltage angle frequency of the energy-storage device converting apparatus; U is an output voltage amplitude of the energy-storage device converting apparatus; $\omega_0$ is a no-load output voltage angle frequency reference value of the energy-storage device converting apparatus; $U_0$ is a no-load output voltage amplitude reference value of the energy-storage device converting apparatus; m is an active power droop factor; n is a reactive power droop factor; P is an active power allocated to the load connected to the energy-storage device converting apparatus; and Q is a reactive power allocated to the load connected to the energy-storage device converting apparatus.

6. The system of claim 1, wherein the power electronic energy-storage switching unit is further configured to: in response to requiring the energy-storage device to provide power to the thermal-power plant high-voltage class I load or the thermal-power plant high-voltage class II load, disconnect the energy-storage grid connection switch, and provide high-voltage electrical energy to the thermal-power plant high-voltage class I load or the thermal-power plant high-voltage class II load; and the power electronic energy-storage switching unit is further configured to: in response to requiring the energy-storage device to provide power to the thermal-power plant low-voltage load, disconnect the energy-storage grid connection switch, and provide low-voltage electrical energy to the thermal-power plant low-voltage load.

7. The system of claim 6, wherein a locking switch is provided among the energy-storage grid connection switch, the high-voltage standby power supply switch, and the low-voltage standby power supply switch.

8. The system of claim 7, wherein in response to the energy-storage grid connection switch being closed, the high-voltage standby power supply switch and the low-voltage plant switch are in a locking state and remain disconnected;

in response to the high-voltage standby power supply switch being closed, the energy-storage grid connection switch and the low-voltage plant switch are in a locking state and remain disconnected; and in response to the low-voltage plant switch being closed, the energy-storage grid connection switch and the high-voltage standby power supply switch are in a locking state and remain disconnected.

9. The system of claim 1, wherein the thermal-power grid connection startup/standby unit further comprises: an auxiliary machine matching the generator, the auxiliary machine comprising a water circulating pump, an oil circulating pump, a coal mill and a boiler;

the auxiliary machine is configured to convert coal into mechanical energy, and the generator is configured to convert the mechanical energy into the electrical energy; and the auxiliary machine and the generator together form a thermal-power unit.

\* \* \* \* \*